United States Patent [19]
Henze

[11] Patent Number: 5,821,755
[45] Date of Patent: Oct. 13, 1998

[54] APPARATUS AND METHOD FOR OBTAINING POWER FROM A BATTERY CHARGER

[75] Inventor: Christopher P. Henze, Lakeville, Minn.

[73] Assignee: Schott Power Systems Incorporated, Wayzata, Minn.

[21] Appl. No.: 560,357

[22] Filed: Nov. 17, 1995

[51] Int. Cl.$^6$ .......................... G01N 27/416; H02M 7/00; H02J 7/04

[52] U.S. Cl. ........................ 324/426; 324/429; 363/89; 320/48

[58] Field of Search .................. 324/426, 428, 324/429, 433; 340/636; 320/48, 51; 363/89; 323/299

[56] References Cited

U.S. PATENT DOCUMENTS

| | | | |
|---|---|---|---|
| 3,663,938 | 5/1972 | Baer | 320/48 |
| 3,898,561 | 8/1975 | Leighton, Sr. | 324/772 |
| 4,035,710 | 7/1977 | Joyce | 363/89 X |
| 4,272,716 | 6/1981 | Etienne | 320/14 |
| 4,806,843 | 2/1989 | Mertens et al. | 363/89 X |
| 4,988,889 | 1/1991 | Oughton, Jr. | 307/66 |
| 5,216,585 | 6/1993 | Yasumura | 363/19 |
| 5,270,636 | 12/1993 | Lafferty | 320/61 |
| 5,371,667 | 12/1994 | Nakoa et al. | 363/89 X |
| 5,428,560 | 6/1995 | Leon et al. | 364/578 |
| 5,442,539 | 8/1995 | Cuk et al. | 363/89 |
| 5,517,399 | 5/1996 | Yamauchi et al. | 363/89 |
| 5,532,528 | 7/1996 | Lammers | 363/89 X |
| 5,532,918 | 7/1996 | Mayrand et al. | 363/89 |

OTHER PUBLICATIONS

Presentation Materials of Tejindar P. Singh, P.E., entitled "Programmable Battery Simulator" from the minutes of the Connector and Connecting Station Infrastructure Working Committee on Electric Vehicles, EPRI, 1995. (Month unavailable).

*Primary Examiner*—Vinh P. Nguyen
*Assistant Examiner*—Diep Do
*Attorney, Agent, or Firm*—Westman, Champlin & Kelly, P.A.; S. Koehler

[57] ABSTRACT

An apparatus and method for testing a battery charger includes a converter having input terminals connectable to a battery charger for receiving a current, output terminals and a switching device for electrically connecting at least one of the input terminals to the output terminals. A load is connected to the output terminals. A controller controls the switching device to periodically connect the input terminals to the output terminals, and in a preferred embodiment, maintain a desired voltage across the input terminals.

20 Claims, 3 Drawing Sheets

APPARATUS AND METHOD FOR OBTAINING POWER FROM A BATTERY CHARGER

BACKGROUND OF THE INVENTION

The present invention relates generally to electrical equipment testing apparatuses. More particularly, the present invention relates to an apparatus for testing battery chargers.

Testing battery chargers will become more important as electric vehicles become more prevalent. Electric vehicles operate on stored energy contained in batteries present in the vehicle. Periodically, the electric vehicle batteries must be recharged with a battery charger as the energy is consumed.

The battery charger can be located in the owner's home, or can be located in a service station much similar to a conventional gas station to charge a vehicle's batteries on a pay by use basis. Under these conditions, the battery charger will encounter many different types of batteries with varying capacities operating over a wide range of battery voltages, for example, 250 to 430 Vdc. Commonly, the battery charger will not charge the batteries with a constant current, but rather, will charge the batteries with current charge profile that varies the magnitude of the charging current with time. Generally, a battery for an electric vehicle is charged at a low current until a moderate charge level is reached. The battery is then charged at a high current until the battery is nearly fully charged. The battery charger then resumes charging at a low current to slowly reach a full charge state.

To ensure that the battery charger is operating correctly, it must be tested from time to time. An uncharged battery can be connected to the battery charger and charged to test operation of the battery charger. However, this testing method requires that the test battery be transported to the charger. After charging, the battery eventually must be discharged, which requires additional equipment. Furthermore, while the battery is being discharged, the equipment typically cannot be used to test other chargers. Under factory conditions, it may also not be desirable to use real test batteries since the test batteries contain chemicals, which may not be desired in a factory that builds and tests battery chargers. Finally, the ability to repeat selected portions of the charging cycle is not readily available with test batteries since the batteries must be discharged and returned to the selected state.

Other conventional testing techniques use a load resistor connected across the output terminals of the battery charger. The load resistor may comprise a single resistive load in order to simply test whether or not the battery charger is operating. In other systems, a variable load resistor or a resistor bank with discrete resistors that can be interconnected to vary the resistive load can also be used. Although readily available and easy to use, the resistive load does not accurately simulate a battery under all conditions.

SUMMARY OF THE INVENTION

An apparatus for testing a battery charger includes a converter having input terminals connectable to a battery charger for receiving a current, output terminals and a switching device for electrically connecting at least one of the input terminals to the output terminals. A load is connected to the output terminals. A controller controls the switching device to periodically, electrically connect the input terminals to the output terminals, and in a preferred embodiment, maintain a desired voltage across the input terminals.

A preferred method for testing a battery charger comprises the steps of receiving current from the battery charger and storing charge in a capacitor; and periodically transferring stored charge in the capacitor to a dissipating load.

DETAILED DESCRIPTION OF THE PREFERRED EMBODIMENTS

Figure 1:
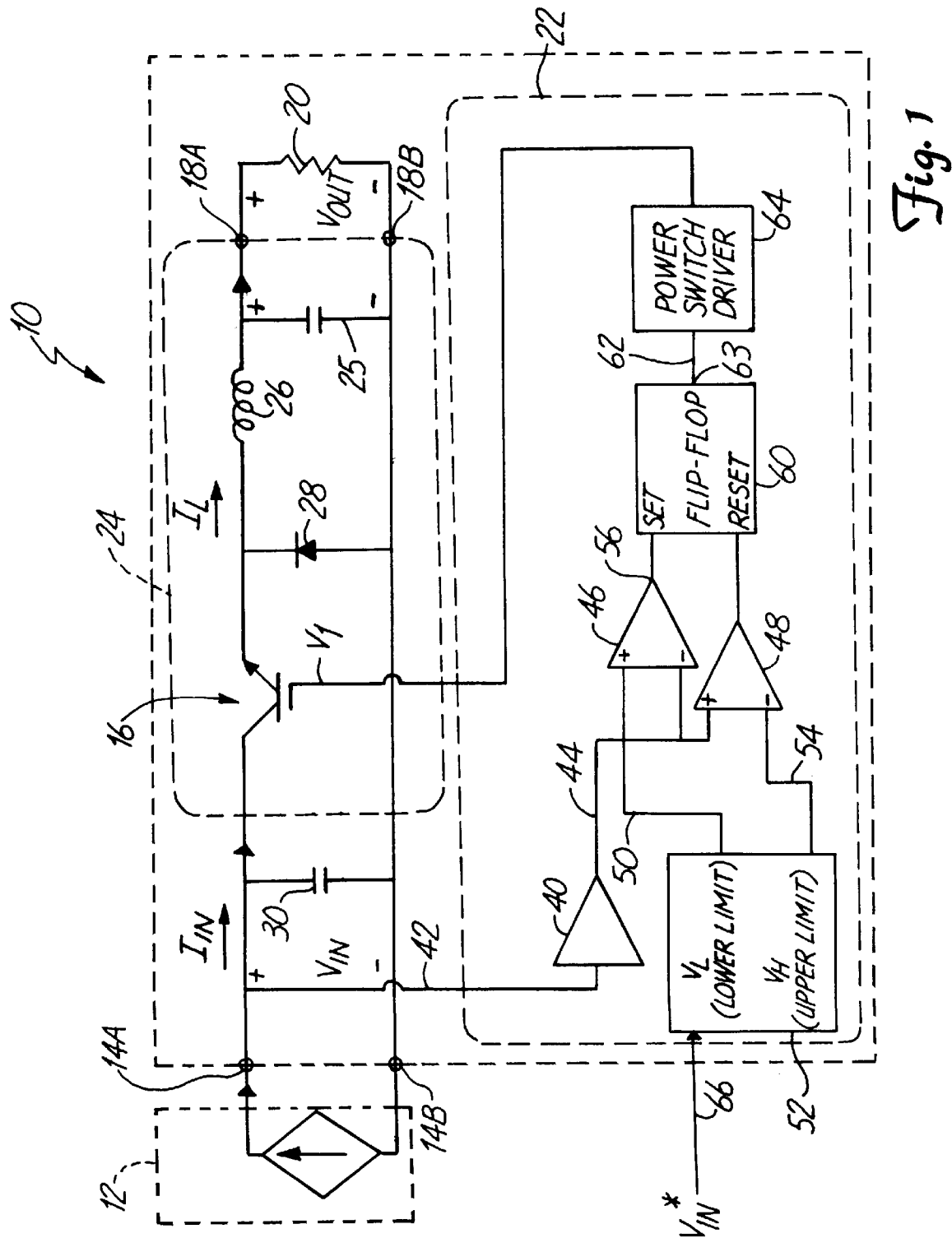
FIG. 1 is a block diagram of a battery charger tester of the present invention.

FIG. 1 illustrates a battery simulator or battery charger tester 10 connected to a battery charger 12 at input terminals 14A and 14B. In a preferred embodiment, the battery charger tester 10 simulates any one of a number of different types of batteries at different charging capacities by controlling the voltage potential across the input terminals 14A and 14B.

In the embodiment illustrated, the battery charger tester 10 includes a switching device 16 that selectively, electrically connects at least one of the input terminals 14A or 14B to at least one output terminal 18A or 18B. A suitable dissipating load 20, such as a single value resistor or a variable resistor, is connected across the output terminals 18A and 18B to receive current provided by the battery charger 12. A controller 22 controls the switching device 16 so as to allow current to flow selectively to the load 20 and also to control the voltage potential across the input terminals 14A and 14B.

In the embodiment illustrated, the switching device 16 is a part of a modified "buck" converter generally designated at 24. The modified buck converter 24 includes an inductor 26 to receive current from the switching device 16. An optional output capacitor 25 is connected to the inductor 26 and across the output terminals 18A and 18B. A diode 28 is connected to the inductor 26 and the switching device 16, and to the output terminal 18B in order to allow current flow when the switching device 16 is turned off. A capacitor 30 is connected to the modified buck converter 24 and across the input terminals 14A and 14B. Although, schematically, the modified buck converter 24 looks like a conventional buck converter, it is not controlled to operate like a conventional buck converter. Specifically, where conventional buck converters are operated to provide a regulated output voltage, the modified buck converter 24 is regulated to control the voltage potential across the input terminals 14A and 14B. The voltage potential across the output terminals 18A and 18B is allowed to vary in response to power supplied from the battery charger 12.

Figure 2A:
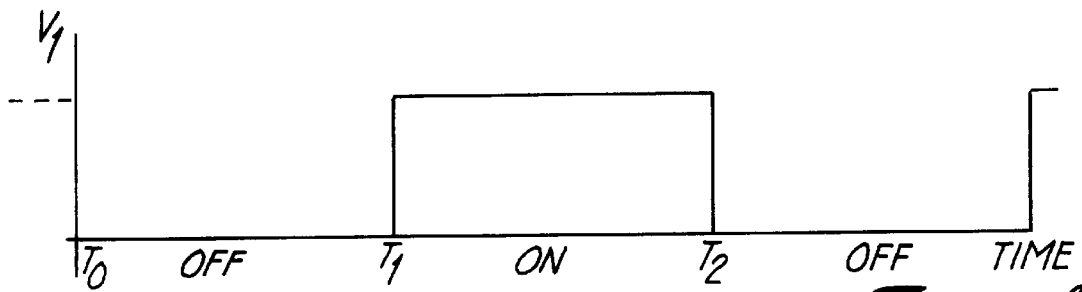
FIGS. 2A–2B are diagrams of various representative waveforms of the battery charger tester of FIG. 1.
Figure 2B:
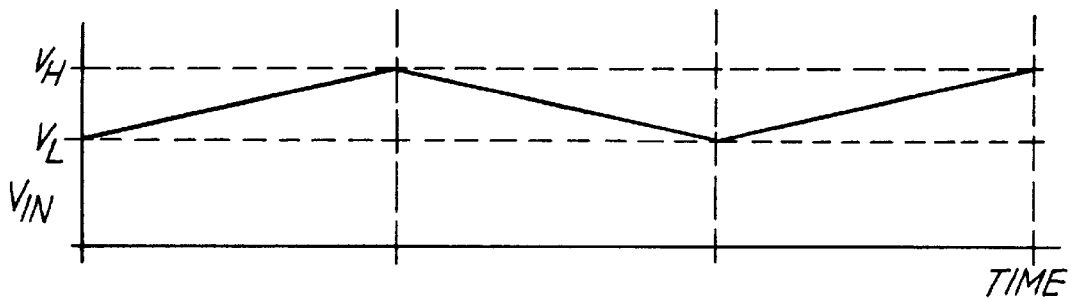

Generally, the controller 22 operates the switching device 16 to maintain the voltage potential across the input terminals 14A and 14B between an upper threshold value and a lower threshold value. Operation of the battery charger tester 10 is as follows. With the battery charger 12 supplying current to the input terminal 14A and assuming for purposes of analysis that current through the inductor 26 is constant over a switching period of the switching element 16, $T_0$ in FIGS. 2A–2B is the instant the switching device 16 has been turned off. From $T_0$ until the switching device 16 changes to an "on" state at $T_1$, all current from the charger $I_{in}$ must flow into the capacitor 30, causing the voltage potential across the input terminals 14A and 14B, $V_{in}$ to increase as illustrated in FIG. 2B until a time $T_1$, where the voltage $V_{in}$ equals an upper limit threshold $V_H$. Generally, while the switching device 16 is off, the voltage $V_{in}$ can be represented by the following equation:

$$V_{in}(t) = V_{in}(T_0) + (I_{in} \cdot t)/C \qquad \text{Equ. 1}$$

where $V_{in}(T_0)$ is the voltage across the input terminals 14A and 14B, and C is the capacitance of the capacitor 30.

At time $T_1$, the controller 22 activates the switching device 16 allowing current to flow through to the inductor 26. In steady state operation, the inductor current $I_L$ will be larger in magnitude than $I_{in}$, causing the voltage across the capacitor 30, hence the voltage $V_{in}$, to decrease according to the following equation and transfer stored charge in the capacitor 30 to the load 20:

$$V_{in}(t) = V_{in}(T_1) - (-I_L I_{in}) \cdot t/C \qquad \text{Equ. 2}$$

When the voltage $V_{in}$ reaches a lower threshold limit $V_L$ illustrated in FIG. 2B at $T_2$, the controller 22 turns the switching device 16 off. It should be understood that the diode 28 allows current $I_L$ to flow while the switching device 16 is turned off. Typically, the upper threshold limit $V_H$ and the lower threshold limit $V_L$ are set very close together so that the difference is preferably 1% or 2% of the desired voltage $V_{in}$. For example, the difference between the upper and lower threshold limits of a battery simulator designed to simulate batteries from 250 to 430 Vdc is 3.0 Vdc. Thus, the voltage $V_{in}$ across the input terminals 14A and 14B appears as an essentially constant voltage load to the battery charger 12.

The voltage across the output terminals 18A and 18B will vary with the power delivered by the battery charger 12. Assuming ideal components of the battery charger tester 10, the power dissipated in a resistive load 20 is equal to:

$$I_{in} \cdot V_{in} = V_{out}^2/R \qquad \text{Equ. 3}$$

Preferably, the load resistor 20 (R) is chosen such that it reaches a voltage that is less than the minimum input voltage design specifications of the battery charger tester 10 when dissipating full power.

It should be understood that the description given above assumed an inductor current $I_L$ that was continuous and constant. Although convenient for analysis purposes, a continuous and constant inductor current $I_L$ is not necessary for operation of the battery charger tester 10. In most applications, the inductor current $I_L$ will have a ripple value that is a significant portion of its average current. As the average current is reduced, corresponding to lower power operation, the inductor current $I_L$ will become discontinuous. Specifically, the inductor current $I_L$ can become zero for significant time intervals. Under these conditions, the rate of change of the inductor current $I_L$ and the voltage across the load 20 becomes more complex; however, the basic operation of the battery charger tester 10 remains unchanged.

In the embodiment illustrated in FIG. 1, the controller 22 includes a scaling amplifier 40 receiving a voltage on a signal line 42 indicative of the voltage across the input terminals 14A and 14B. The scaling amplifier 40 has a suitable gain to reduce the voltage across the input terminals 14A and 14B to appropriate circuit board logic levels on a signal line 44. The signal line 44 is connected to comparators indicated at 46 and 48. The comparator 46 compares the voltage on signal line 44 with the lower limit threshold $V_L$ present on a signal line 50 and generated by a suitable reference generator 52. Similarly, the comparator 48 compares the voltage on signal line 44 with the upper limit threshold $V_H$ present on a signal line 54 also generated by the reference generator 52. Output terminals of comparators 56 and 58 of the comparators 46 and 48, respectively, are connected to a flip flop 60. A signal line 62 connects an output 63 of the flip flop 60 with a suitable isolated power switch driver 64 used to generate suitable control signals to the switching device 16 in accordance with the output 63 of the flip flop 60.

The controller 22 operates as follows. A "setpoint" or desired voltage potential $V^*_{in}$ across the input terminals 14A and 14B is provided as an input to the reference generator 52 at 66. The lower limit threshold $V_L$ and the upper limit threshold $V_H$ in this embodiment are fixed percentages of the desired voltage potential $V^*_{in}$ across the input terminals 14A and 14B. Of course, if desired, multiple setpoints can be provided to individually adjust the lower limit threshold $V_L$ and the upper limit threshold $V_H$.

Comparators 46 and 48 compare the scaled signal on signal line 44 with the lower limit threshold $V_L$ and the upper limit threshold $V_H$. Referring to FIG. 2B, at time $T_0$, when the lower limit threshold has been reached, comparator 56 provides a suitable output signal at output terminal 56 to "set" the flip flop 60, which in turn causes a suitable output signal at output terminal 63 to initiate the power switch driver 64 and turn-on the switching device 16. When the voltage across the input terminals 14A and 14B reaches the upper threshold limit $V_H$ as detected by comparator 48, the flip flop 60 is "reset" from an output 58 of the comparator 48, which in turn causes the power switch driver 64 to turn off the switching device 16.

Figure 3:
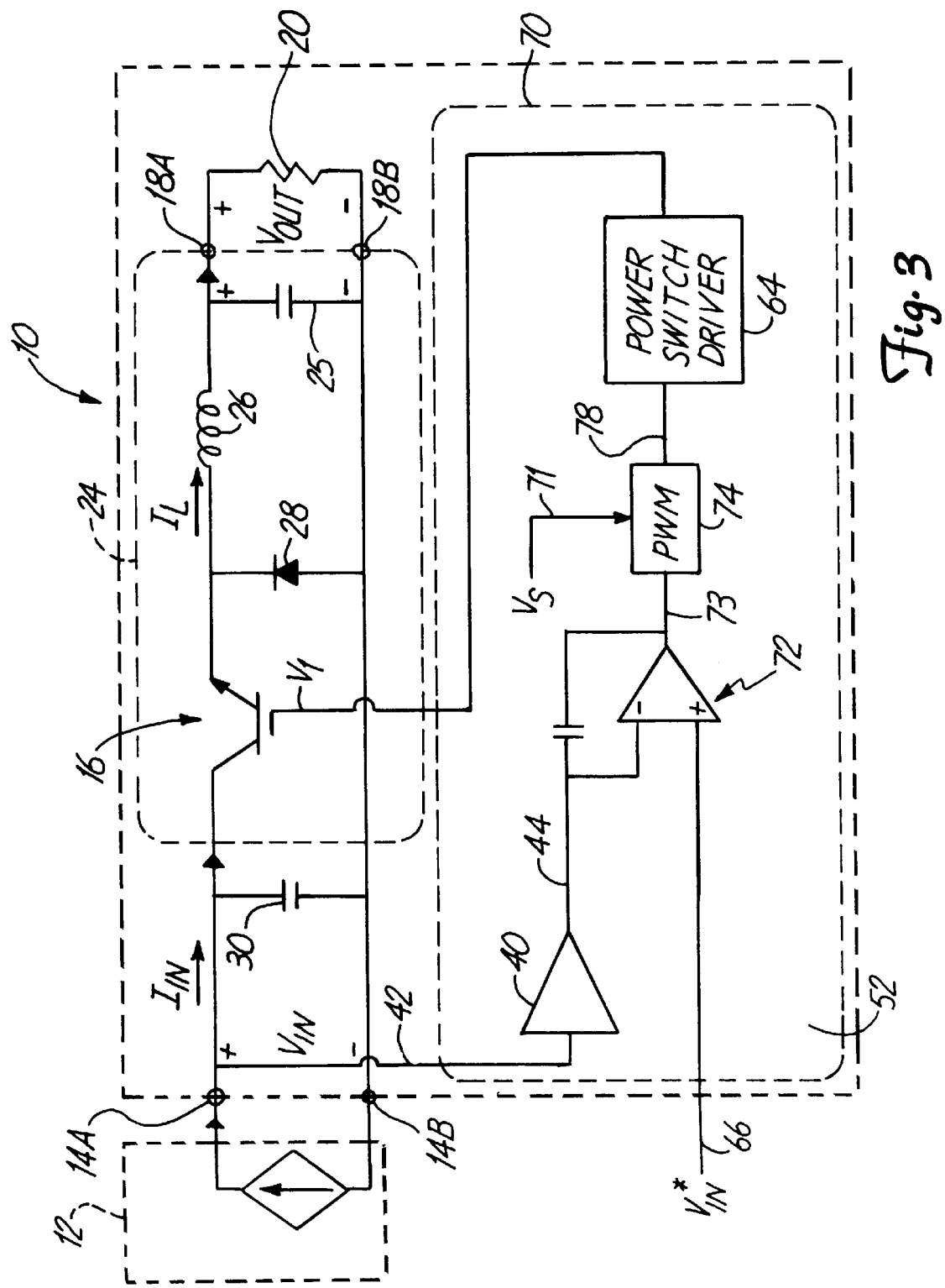
FIG. 3 is a block diagram of a second embodiment of a battery charger tester of the present invention.

A second embodiment of a controller 70 suitable for controlling the switching device 16 is illustrated in FIG. 3. The controller 70 adjusts the on-duration of the switching device 16 to control the voltage potential across the input terminals 14A and 14B. The controller 70 includes the scaling amplifier 40 producing a signal on the signal line 44 indicative of the voltage potential across the input terminals 14A and 14B. Signal line 44 is operably connected to integrator indicated at 72. The integrator 72 receives as a second input the desired voltage potential $V^*_{in}$ across the input terminals 14A and 14B. The integrator 72 integrates a difference between the signal present on signal line 44 and the desired voltage potential $V^*_{in}$ across the input terminals 14A and 14B.

An output signal of the integrator 72 is provided to a pulse-width modulator 74 on signal line 73. In the embodiment illustrated, the pulse-width modulator 74 compares the output signal from the integrator 72 with a repetitive waveform at input 71 such as a sawtooth waveform illustrated in FIG. 4A. In this embodiment, a time period $T_S$ of the repetitive waveform is kept constant and is chosen so that a frequency $f_S$ is a few kilohertz to a few hundred kilohertz range.

Figure 4A:
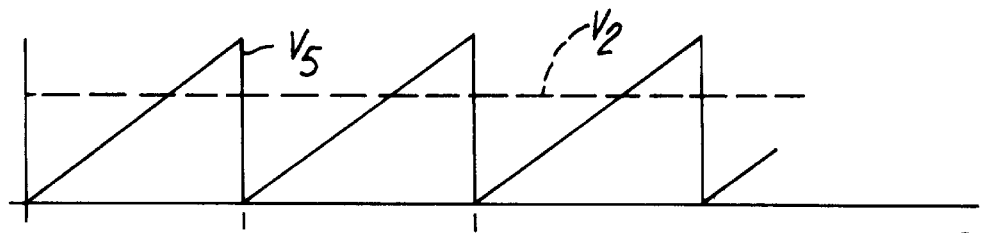
FIGS. 4A–4B are diagrams of various representative waveforms of the battery charger tester of FIG. 3.
Figure 4B:
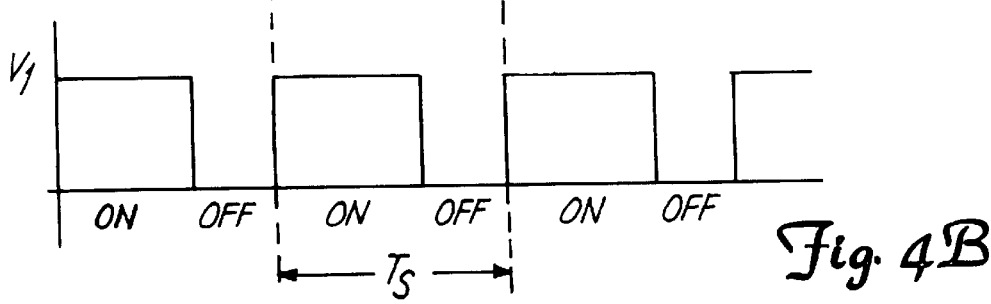

Referring to FIGS. 4A and 4B, when the voltage of the output signal $V_2$ from the integrator 72, which varies very slowly with time relative to the frequency $f_S$, is greater than the voltage $V_S$ of the repetitive sawtooth waveform, the pulse-width modulator 74 provides a suitable control signal on a signal line 78 to the power switch driver 64, causing the switching device 16 to turn on. Otherwise, when the voltage $V_S$ of the repetitive sawtooth waveform is greater than the voltage of the output signal $V_2$ from the integrator 72, the switching device 16 is turned off. It is to be understood that other known controllers for controlling the switching device 16 such as current mode controllers that control the current $I_L$ and the voltage potential across the input terminals 14A and 14B to a desired level, can also be used.

Although switch device 16 is illustrated as an insulated gate bipolar transistor (IGBT), other suitable switching devices include a gate-turn-off (GTO) thyristor, MOSFET, BJT, mos-controlled thyristor (MCT) or simply a relay. The power switch driver 64 is designed for the switching device used. Typically, the driver 64 includes isolation circuitry and a suitable power supply for the switching device used.

Although the present invention has been described with reference to preferred embodiments, workers skilled in the art will recognize that changes may be made in form and detail without departing from the spirit and scope of the invention.

What is claimed is:

1. A battery charger tester for obtaining electrical power from a battery charger, the battery charger tester comprising:
    a converter having input terminals connectable to a battery charger for selectively receiving a current, output terminals and a switching device for electrically connecting at least one of the input terminals to the output terminals;
    a load connected to the output terminals to receive current from the switching device and for dissipating electrical power from the battery charger; and
    a controller operably connected to the converter for controlling the switching device to control the current drawn from the battery charger and to control a voltage potential across the input terminals to simulate a battery.

2. The battery charger tester of claim 1 wherein the controller includes a comparator for comparing the voltage potential across the input terminals with a reference potential.

3. The battery charger tester of claim 2 wherein the controller includes a second comparator for comparing the voltage potential across the input terminals with a second reference potential.

4. The battery charger tester of claim 3 wherein the controller includes a switch driver operably connected to the comparators and the switching device, the switch driver activating the switching device when an output signal from the first-mentioned comparator is received and deactivating the switching device when an output signal from the second comparator is received.

5. The battery charger tester of claim 1 wherein the controller includes an integrator receiving a signal indicative of the voltage potential across the input terminals as an input and a reference signal as a second input and integrating a difference between the signal and the reference signal as an output signal.

6. The battery charger tester of claim 5 wherein the controller includes a modulator operably connected to the integrator and the switching device, the modulator receiving the output signal from the integrator.

7. The battery charger tester of claim 6 wherein the modulator comprises a pulse-width modulator.

8. The battery charger tester of claim 1 wherein the dissipating load comprises a resistive device.

9. A method for obtaining electrical power from a battery charger comprising the steps of:
    drawing a current from the battery charger through output terminals of the battery charger and storing charge in a capacitor;
    periodically transferring stored charge in the capacitor to a load for dissipating the electrical power; and
    controlling a voltage potential across the output terminals of the battery charger to simulate a battery.

10. The method of claim 9 wherein the step of periodically transferring stored charge includes operating a switching device electrically connected between the capacitor and the dissipating load.

11. The method of claim 10 wherein an inductor is electrically connected to between the switching device and the dissipating load to receive current from the switching device.

12. The method of claim 10 wherein the step of periodically transferring stored charge includes operating the switching device so as to control the voltage potential across the battery charger and dissipating the electrical power as heat.

13. A battery charger tester for obtaining electrical power from a battery charger, the battery charger tester comprising:
    input terminals;
    a capacitor connected to the input terminals for receiving a current from the battery charger and storing charge;
    a load for dissipating electrical power from the battery charger; and
    a switching device electrically connected between the capacitor and the dissipating load, the switching device periodically transferring at least some of the stored charge to the dissipating load and to control a voltage potential across the input terminals to simulate a battery.

14. The battery charger tester of claim 13 and further comprising a controller operably connected to the switching device for operating the switching device to control the voltage potential across terminals of the battery charger.

15. The battery charger tester of claim 14 wherein the controller includes a comparator for comparing the voltage potential across the terminals of the battery charger with a reference potential.

16. The battery charger tester of claim 15 wherein the controller includes a second comparator for comparing the voltage potential across the terminals of the battery charger with a second reference potential.

17. The battery charger tester of claim 16 wherein the controller includes a switch driver operably connected to the comparators and the switching device, the switch driver activating the switching device when an output signal from the first-mentioned comparator is received and deactivating the switching device when an output signal from the second comparator is received.

18. The battery charger tester of claim 14 wherein the controller includes an integrator receiving a signal indicative of the voltage potential across the input terminals as an input and a reference signal as a second input and integrating a difference between the signal and the reference signal as an output signal.

19. The battery charger tester of claim 18 wherein the controller includes a modulator operably connected to the integrator and the switching device, the modulator receiving the output signal from the integrator.

20. The battery charger tester of claim 13 and an inductor for receiving current from the switching device.

\* \* \* \* \*